(12) United States Patent
Vasseur et al.

(10) Patent No.: US 8,199,658 B2
(45) Date of Patent: Jun. 12, 2012

(54) OAM TOOLS FOR MESHED TUNNELS IN A COMPUTER NETWORK

(75) Inventors: Jean-Philippe Vasseur, Dunstable, MA (US); Stefano Novello, Chyne (CZ)

(73) Assignee: Cisco Technology, Inc., San Jose, CA (US)

( * ) Notice: Subject to any disclaimer, the term of this patent is extended or adjusted under 35 U.S.C. 154(b) by 367 days.

(21) Appl. No.: 12/048,390

(22) Filed: Mar. 14, 2008

(65) Prior Publication Data

US 2009/0232003 A1 Sep. 17, 2009

(51) Int. Cl.
*G01R 31/06* (2006.01)
(52) U.S. Cl. ........................................ 370/242; 370/392
(58) Field of Classification Search .................. 370/216, 370/241, 242, 392; 709/230
See application file for complete search history.

(56) References Cited

U.S. PATENT DOCUMENTS

| 7,013,342 | B2 * | 3/2006 | Riddle .......................... 709/230 |
| 7,031,266 | B1 | 4/2006 | Patel et al. |
| 7,043,541 | B1 | 5/2006 | Bechtolsheim et al. |
| 7,085,224 | B1 * | 8/2006 | Oran ............................. 370/216 |
| 7,230,913 | B1 * | 6/2007 | Vasseur et al. ................. 370/216 |
| 2005/0281192 | A1 | 12/2005 | Nadeau et al. |
| 2006/0171316 | A1 | 8/2006 | El-Sakkout et al. |
| 2006/0233137 | A1 | 10/2006 | Dantu et al. |
| 2006/0245436 | A1 | 11/2006 | Sajassi |

* cited by examiner

*Primary Examiner* — Jianye Wu
*Assistant Examiner* — Mon Cheri S Davenport
(74) *Attorney, Agent, or Firm* — Cesari and McKenna, LLP

(57) ABSTRACT

In one embodiment, a tunnel mesh probe, initiated for a computer network having a tunnel mesh, may be received at a first tail-end node of a probed tunnel. In response, the first tail-end node processes the probe, and forwards the probe to another tail-end node of a non-probed tunnel selected from a plurality of tunnels of the tunnel mesh for which the first tail-end node is a head-end node. Illustratively, once the probe is received at its initiating node, and in response to determining that the initiating node is a head-end node for only probed tunnels, the tunnel mesh probe is completed, having probed all tunnels of the tunnel mesh.

21 Claims, 11 Drawing Sheets

OAM TOOLS FOR MESHED TUNNELS IN A COMPUTER NETWORK

TECHNICAL FIELD

The present disclosure relates generally to computer networks, and, more particularly, to meshed tunnels in computer networks.

BACKGROUND

The use of tunnels, such as those provided by Multi-Protocol Label Switching (MPLS) Traffic Engineering (TE), may be both tactical (e.g., a set of tunnels configured to temporarily off-load congestion) and strategic (e.g., a full mesh of tunnels configured among a set of nodes/routers, for example tens to hundreds). For strategically planned tunnels/TE, service providers may benefit from advanced provisioning and troubleshooting tools since MPLS TE, for example, undoubtedly increases network complexity. Network-based provisioning tools have been designed to automate the generation of a mesh of tunnels between a set of routers, thus allowing simplification of configuration. For instance, according to a known AutoMesh technique, each router of the mesh may advertise its mesh membership, and a template is used by each router of that mesh to establish the required tunnels. For troubleshooting, a number of tools have been designed to perform Operations, Administration, and Maintenance (OAM) functions for each individual tunnel, but this becomes quickly cumbersome as the number of tunnels (or routers in a mesh) grows. For instance, a mesh of fifty routers requires the monitoring of 2450 tunnels individually.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a tunnel mesh probe, initiated for a computer network having a tunnel mesh, may be received at a first tail-end node of a probed tunnel. In response, the first tail-end node processes the probe, and forwards the probe to another tail-end node of a non-probed tunnel selected from a plurality of tunnels of the tunnel mesh for which the first tail-end node is a head-end node. Illustratively, once the probe is received at its initiating node, and in response to determining that the initiating node is a head-end node for only probed tunnels, the tunnel mesh probe is completed, having probed all tunnels of the tunnel mesh.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
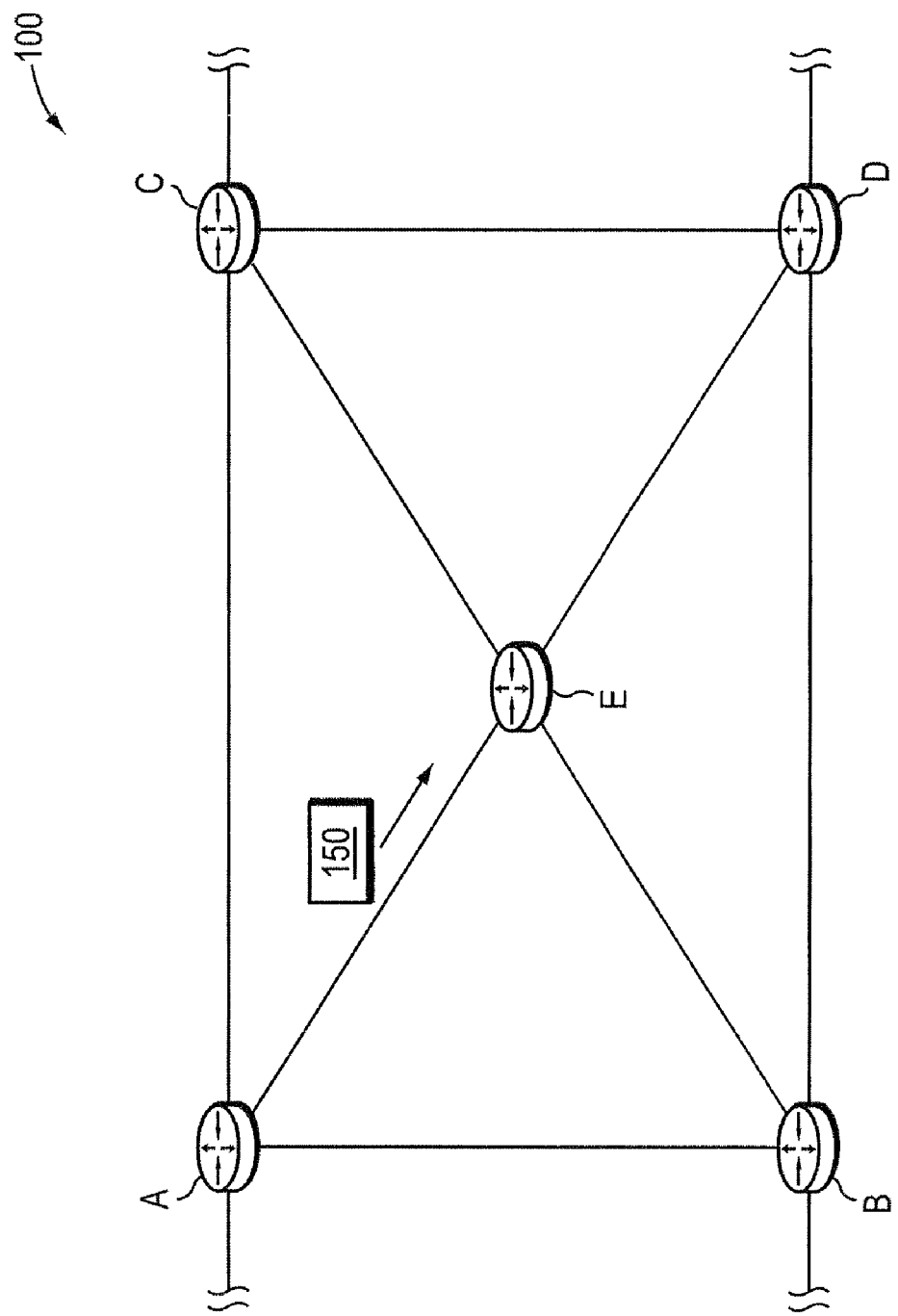
FIG. 1 illustrates an example computer network.

FIG. 1 is a schematic block diagram of an example computer network 100 illustratively comprising nodes/devices, such as nodes A-E interconnected by links as shown. Those skilled in the art will understand that any number of nodes, devices, links, etc. may be used in the computer network, and that the view shown herein is for simplicity. For instance, nodes A-E are interconnected by links as shown, however, certain links may comprise additional nodes, not shown for clarity of illustration. Those skilled in the art will also understand that while the embodiments described herein is described generally, it may apply to any network configuration within an Autonomous System (AS) or area, or throughout multiple ASes or areas, etc.

Data packets (traffic) 150 may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, Multi-Protocol Label Switching (MPLS) (or other tunneling protocols), etc.

Figure 2:
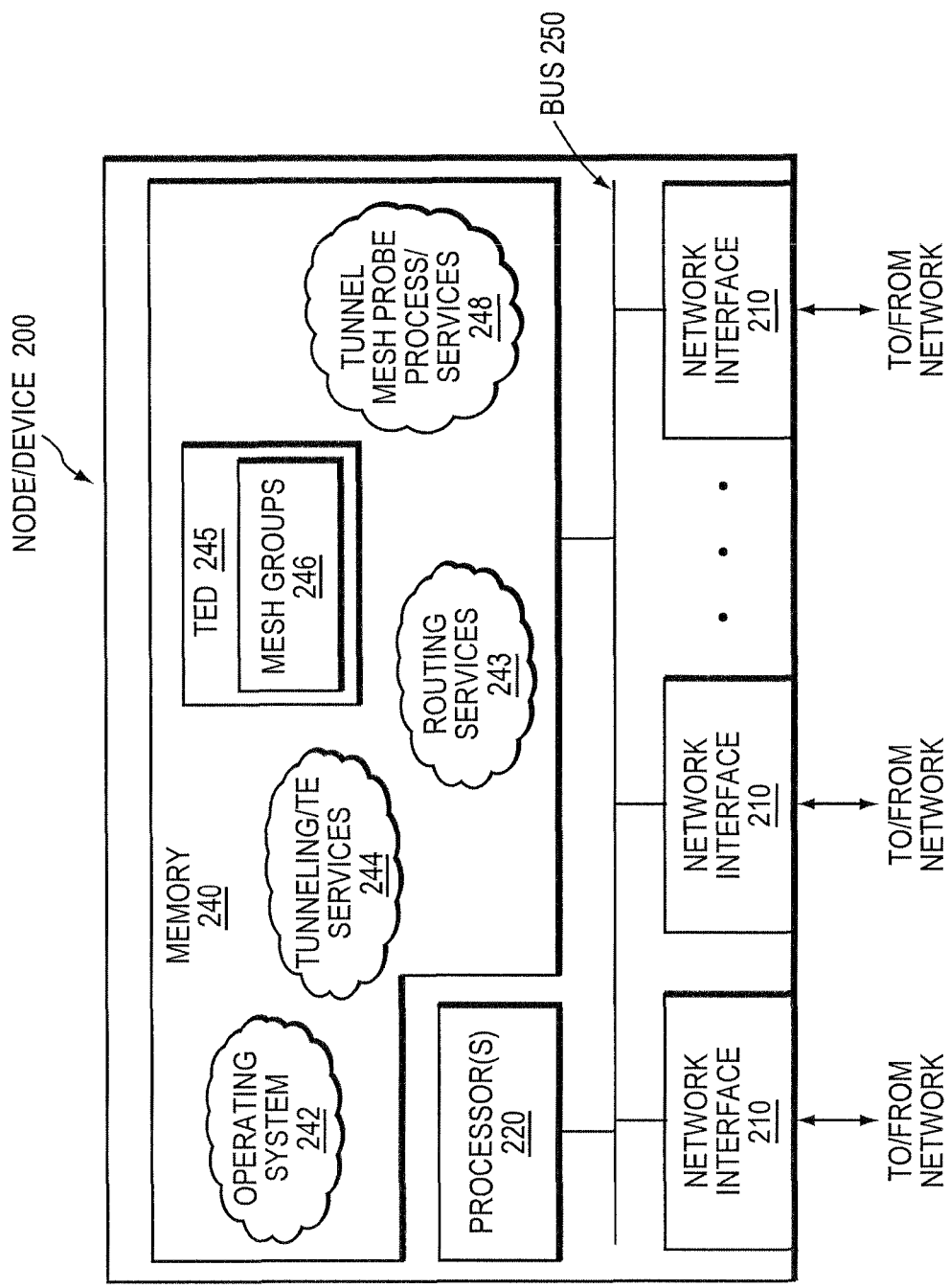
FIG. 2 illustrates an example network device/node.

FIG. 2 is a schematic block diagram of an example node/device 200 that may be advantageously used with one or more embodiments described herein, e.g., as one or more nodes A-E. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), MPLS, etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor(s) 220 may comprise necessary elements or logic adapted to execute the software programs and manipulate the data structures, such as a Traffic Engineering database (TED) 245 and "mesh groups" structure 246 (described herein). An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 243 and tunneling/TE services 244, illustratively cooperating with tunnel mesh probe process 248, as described herein. It will be apparent to those skilled in the art that other processor and memory types, including various computer-readable media, may be used to store and execute program instructions pertaining to the inventive technique described herein.

Routing services 243 contain computer executable instructions executed by each processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 243 may also perform functions related to virtual routing protocols, such as maintaining VRF instances (not shown).

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various techniques.

In particular, tunneling/TE services 244 contain computer executable instructions for implementing tunnels, such as through RSVP TE and processing RSVP messages in accordance with the embodiments described herein. TED 245 may be illustratively resident in memory 240 and used to store TE information provided by the routing protocols, such as IGP, BGP, and/or RSVP (e.g., with TE extensions). The TED may be illustratively maintained and managed by tunneling/TE services 244.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

Establishment of a tunnel (e.g., TE-LSP) requires computation of a path between a head-end node (LSR) to a tail-end node, signaling along the path (e.g., through RSVP-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node (e.g., in a distributed manner, as described herein) or by some other entity operating as a path computation element (PCE) not co-located on the head-end node. Various path computation methodologies are available including CSPF (constrained shortest path first).

In particular, in accordance with RSVP, to request a data flow (tunnel) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the tunnel. The Path message may contain various information about the data flow including, e.g., traffic characteristics of the data flow. Also in accordance with the RSVP, a receiver establishes the tunnel between the sender and receiver by responding to the sender's Path message with a reservation request (Resv) message. The reservation request message travels upstream hop-by-hop along the flow from the receiver to the sender (i.e., along intermediate nodes). The reservation request message contains information that is used by intermediate nodes along the flow to reserve resources for the data flow between the sender and the receiver, to confirm the attributes of the tunnel, and provide a tunnel label. If an intermediate node in the path between the sender and receiver acquires a Path message or Resv message for a new or established reservation (tunnel) and encounters an error (e.g., insufficient resources, failed network element, etc.), the intermediate node generates and forwards a path or reservation error (PathErr or ResvErr, hereinafter Error) message to the sender or receiver, respectively.

Figure 3:
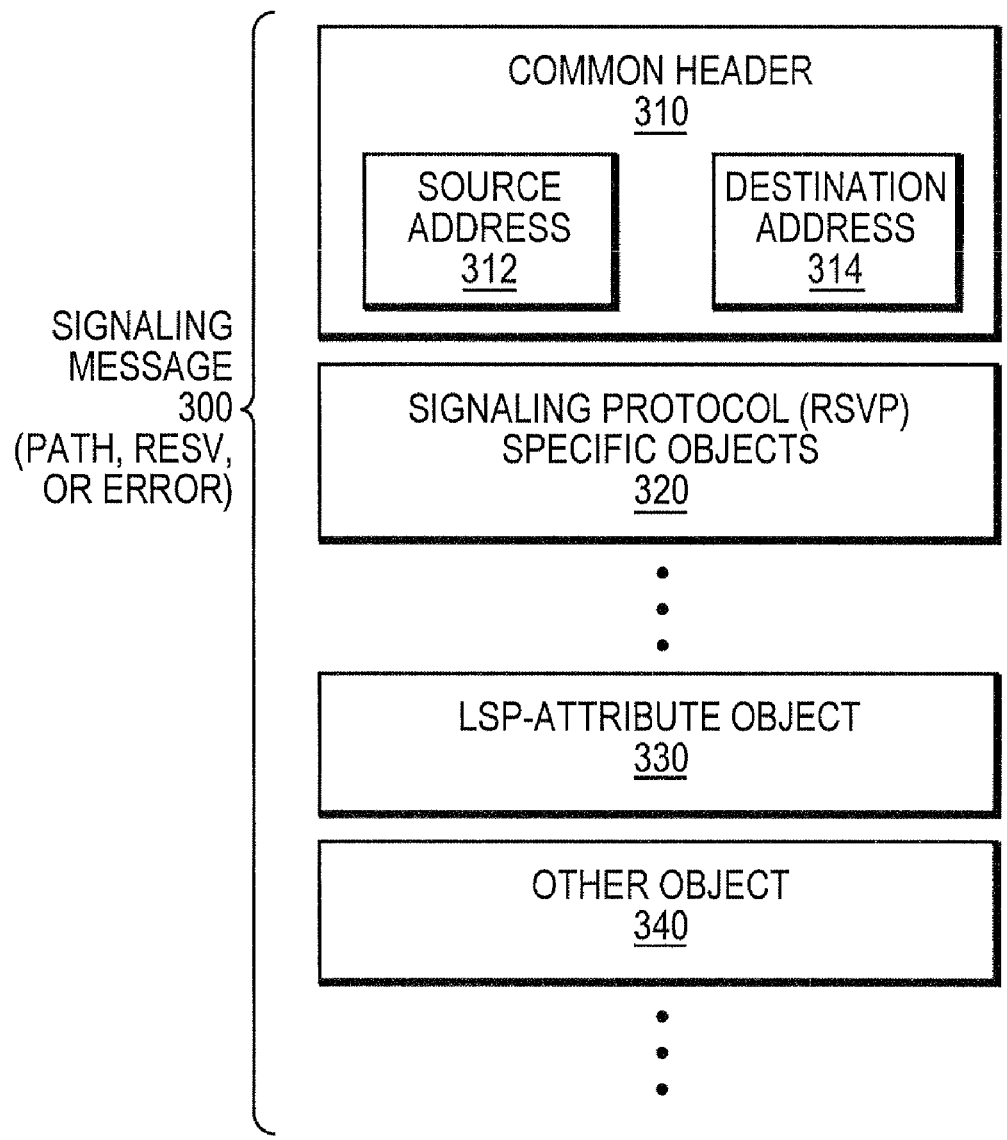
FIG. 3 illustrates an example signaling message.

FIG. 3 is a schematic block diagram of portions of a signaling message 300 (e.g., RSVP message, such as Path, Resv or Error) that may be advantageously used in accordance with one or more embodiments described herein. Message 300 contains, inter alia, a common header 310, one or more signaling protocol specific objects 320, such as an LSP-Attribute object 330, as well as one or more other objects 340, e.g., formatted as one or more variable length fields 400, which each have a specific type (or code), length, and value (TLV) as described further herein. The common header 310 may comprise a source address 312 and destination address 314, denoting the origination and requested termination of the message 300. Protocol specific objects 320 contain objects necessary for each type of message 300 (e.g., Path, Resv, Error, etc.). For instance, a Path message may have a sender template object, Tspec object, Previous-hop object, etc. A Resv message, on the other hand, may have specific objects 320 for a label object, session object, filter spec object, etc. Also, Error messages 300 (e.g., PathErr or ResvErr), may have specific objects 320, such as for defining the type of error, etc. Various flags and/or TLVs 400 may also be contained within the objects 320-340, as will be understood by those skilled in the art.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
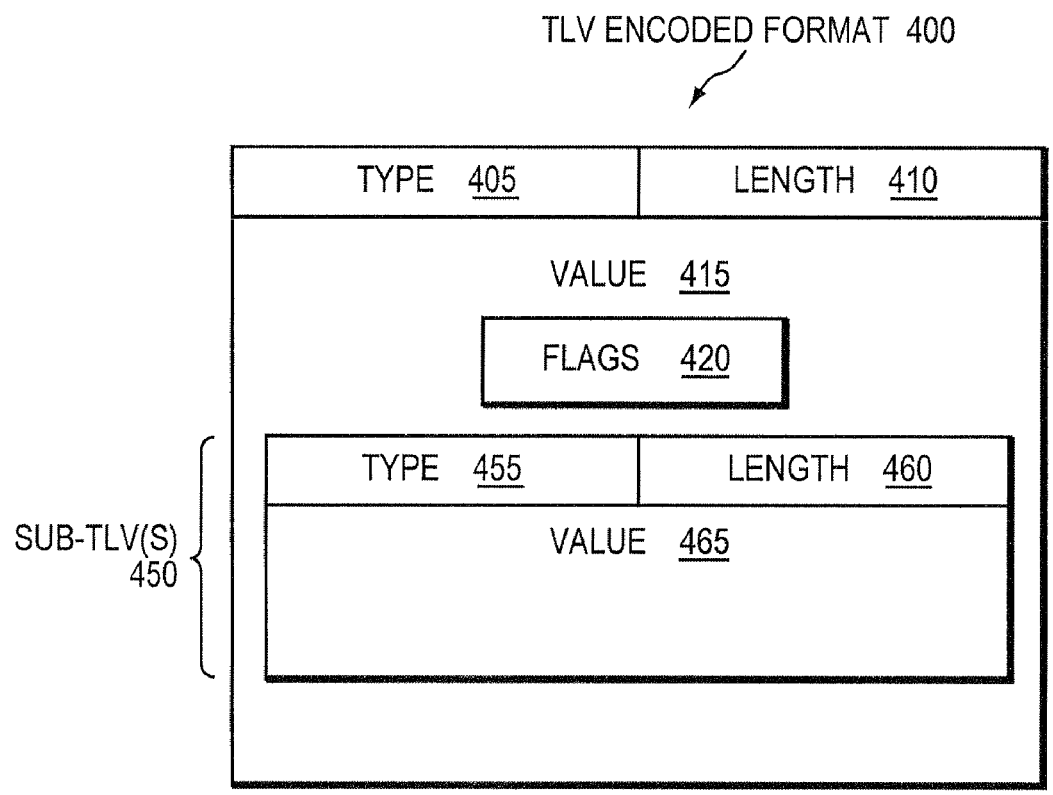
FIG. 4 illustrates an example variable length field.

FIG. 4 is a schematic block diagram illustrating the TLV encoded format 400 that may be advantageously used with the one or more embodiments described herein. The TLV 400 may be used for a variable length field contained in a message (e.g., an RSVP message 300), or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein.

It should be noted that in accordance with RSVP signaling, the state of the RSVP is refreshed on a timed interval, e.g., every thirty seconds, in which RSVP Path and Resv messages are exchanged. This timed interval is configurable by a system administrator. Moreover, various methods understood by those skilled in the art may be utilized to produce route record objects (RROs) and/or explicit route objects (EROs) contained in signaling messages for a tunnel that may be used to store, e.g., hop-by-hop information about the tunnels.

As noted, the use of tunnels (e.g., MPLS TE-LSPs) may be both tactical (e.g., a set of tunnels configured to temporarily off-load congestion) and strategic (e.g., a full mesh of tunnels configured among a set of nodes/routers, for example tens to hundreds). For strategically planned tunnels/TE, service providers may benefit from advanced provisioning and troubleshooting tools since MPLS TE, for example, undoubtedly increases network complexity. Network-based provisioning tools have been designed to automate the generation of a mesh of tunnels between a set of routers, thus allowing simplification of configuration. For instance, according to a known AutoMesh technique, each router of the mesh may advertise its mesh group membership, and a template is used by each router of that mesh to establish the required tunnels.

A mesh group is a group of nodes that is connected in a mesh arrangement to each and every other node of the mesh group. In particular, AutoMesh groups are mesh groups that are dynamically established by advertising node memberships to particular groups. For example, to advertise AutoMesh group information for a domain (e.g., network 100), nodes interested in being a member of a particular group may each send an AutoMesh advertisement (e.g., an IGP advertisement) within the network 100 indicating its group membership (stored within TED 245 as mesh groups 246). Illustratively, assume that nodes A-D (not E) belong to an AutoMesh group. As such, in accordance with AutoMesh and MPLS TE techniques, each of the nodes A-D establishes a tunnel to each other node of the group, e.g., a tunnel from A to B, A to C, A to D, B to A, B to C, etc. For example, assume a set of routers, e.g., A-D, that is interconnected by a mesh of tunnels. As used herein, a tunnel may be defined as its head-end node and tail-end node, such as, e.g., "tunnel A-B" from node A to node B, "tunnel C-B" from node C to node B, etc. Depending on the number of nodes in the mesh, the number of tunnels is the number of nodes 'n'*(n−1).

For troubleshooting strategically planned tunnels/TE, a number of tools have been designed to perform Operations, Administration, and Maintenance (OAM) functions for each individual tunnel, but this becomes quickly cumbersome as the number of tunnels (or routers in a mesh) grows. For instance, a mesh of fifty routers requires monitoring of 2450 tunnels individually (note that with four meshed nodes A-D, twelve tunnels must be checked). Currently, monitoring tunnels of an entire mesh is performed by using a Network Management System (NMS) based tool that checks the mesh by polling all head-end nodes of all the tunnels individually, which is slow and expensive, and difficult to scale. Also, NMS-based tools require separate access to each router/node of the mesh, and may be performed only at an NMS-configured device within the network.

Tunnel Mesh Probing

According to embodiments of the disclosure, a tunnel mesh probe, initiated for a computer network having a tunnel mesh, may be received at a first tail-end node of a probed tunnel. In response, the first tail-end node processes the probe, and forwards the probe to another tail-end node of a non-probed tunnel selected from a plurality of tunnels of the tunnel mesh for which the first tail-end node is a head-end node. Illustratively, once the probe is received at its initiating node, and in response to determining that the initiating node is a head-end node for only probed tunnels, the tunnel mesh probe is completed, having probed all tunnels of the tunnel mesh.

In an illustrative embodiment, tunnel mesh probe process/service 248 contains computer executable instructions executed by each processor 220 of the network device 200 to perform functions related to the novel techniques described herein, e.g., in cooperation with tunneling/TE services 244. In particular, probe process 248 may be used to originate a probe from any router of a particular tunnel mesh that travels through the mesh "bouncing" between mesh nodes (head/tail-end nodes or edges) to collect various OAM/TE metrics (e.g., tunnel "liveness," whether a tunnel follows the shortest path, etc.). In this manner, TE mesh metrics may be quickly gathered for all tunnels of the mesh from any router of the mesh. For example, the tunnel mesh probe process may execute on head-end nodes, tail-end nodes, and/or mid-point nodes of network 100 (e.g., any of nodes A-E) as described herein, such as depending on the nature of the metrics of interest.

In particular, as described herein, if the metric of interest is the tunnel's control plane state, this can be checked by the head-end node. In this case, after processing by the head-end, the probe is then labeled switched onto the tunnel to be processed by a next node of the mesh. Also, where the metric of interest is the proportion of tunnels that follow (or do not follow) the shortest path (e.g., an IGP path), which is a key metric (especially for MPLS TE), if each tunnel comprises "strict hops" (i.e., each hop along the tunnel is known by the head-end node), then head-end node processing is sufficient, in which case the probe is labeled switched as before. By contrast, if the tunnel is made of "loose hops," which is fairly common with inter-domain tunnels, the head-end node may not have a full visibility of the tunnel's path, and thus may be unable to determine whether the tunnel follows the shortest/IGP path. In this case, the probe may be sent for the particular tunnel by being routed (e.g., IP routed, not label switched) to the tunnel's tail-end node, illustratively carried within the Path message 300. Accordingly, a mid-point node (e.g., node E, typically a domain border router in an example of loose hops) may process the probe to determine whether the tunnel comprises the shortest path. Further, tail-end nodes may also process the probes, such as where the metric of interest is mesh/tunnel "liveness," that is, whether the tunnels are functional between nodes.

Thus depending on the metric(s) of interest, a probe traveling along a TE/tunnel mesh may either be label switched ("on the tunnel") between edges (head/tail-end nodes), or may follow the tunnel's path by being carried in the RSVP Path messages 300 ("not on the tunnel"). Illustratively, the probe may be embodied as a TLV object 400 (e.g., called "TE-Mesh-Probe") as defined herein that is either carried within the LSP-Attribute object 330 of a Path message 300, or that natively travels along the tunnel when labeled switched as a standalone message.

Figure 5:
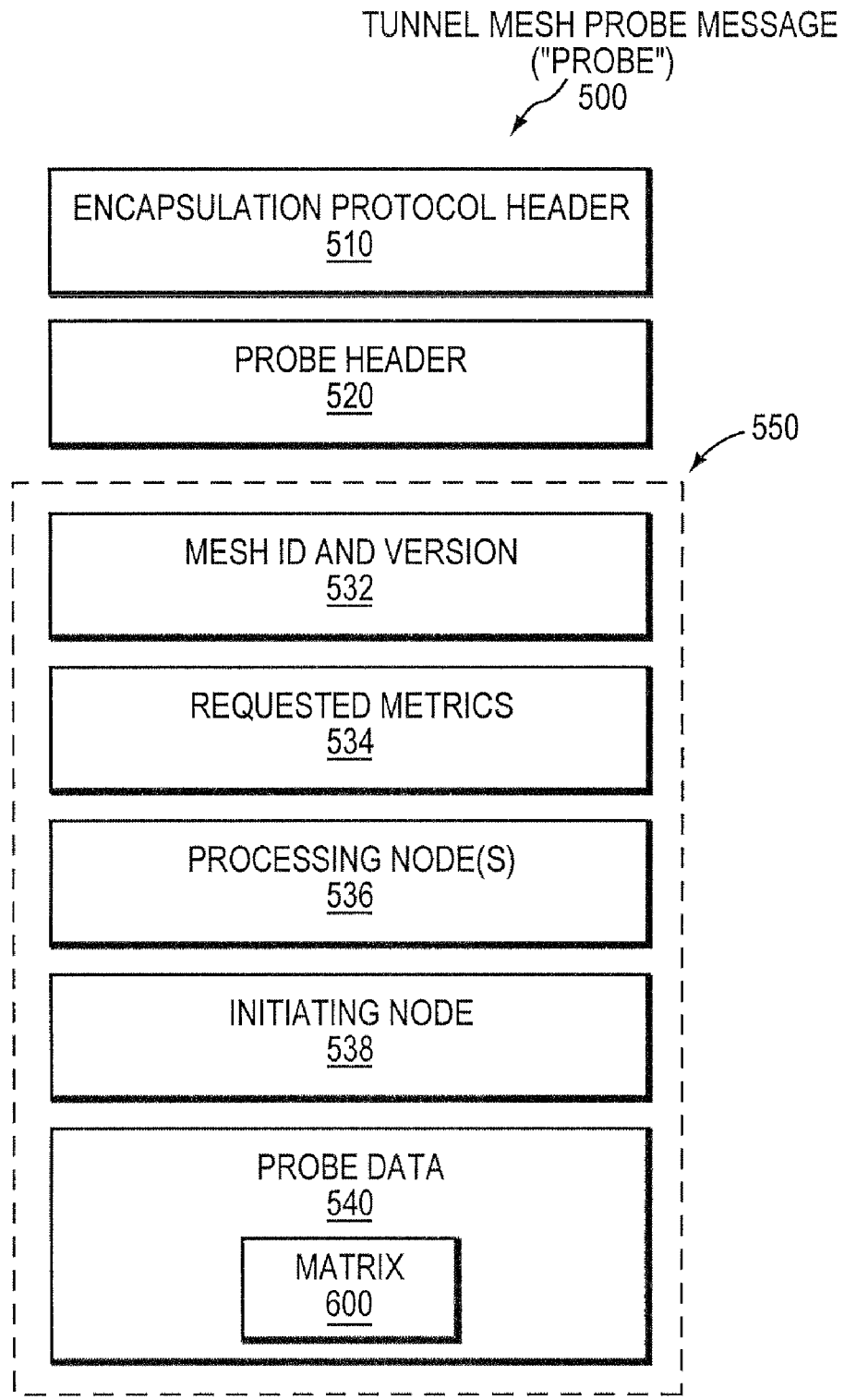
FIG. 5 illustrates an example tunnel mesh probe message.

FIG. 5 illustrates an example tunnel mesh probe message ("probe") 500 that may be transmitted by head-end nodes A-D as described herein. Illustratively, the probe 500 is a generic message format, and those skilled in the art will understand that other formats may comprise other fields accordingly. Also, as mentioned above, the probe may be embodied as a TLV object 400 within a Path message 300, and as such, need not comprise separate header information (described below), and need only carry the relevant probe information, illustratively shown as dashed box 550. Generally, as referred to herein, "probe 500" may refer to a standalone probe (when sent on the tunnel) or a probe embodied as a TLV 400 within a Path (or other) message 300 (when not sent on the tunnel), the difference being only formatting of the probe, such as inclusion of header information.

In particular, the probe 500 may include an encapsulation protocol header 510, an optional probe header field 520, and within box 550, one or more probe-specific fields. As those skilled in the art will understand, probe messages 500 may be sent on the tunnel in an encapsulation appropriate to the environment (e.g., MPLS, etc.). Thus, the encapsulation protocol header 510 contains information standard for the specific type of encapsulation. The probe header field 520 may comprise information such as, e.g., a source node (head-end node) of the probe 500, and a corresponding destination node (tail-end node). Also, within probe-specific fields box 550, probe 500 may contain, as described herein, a mesh identification (ID) and version number 532, one or more flags/fields 534 indicating requested metrics and flags/fields 536 indicating whether the probe is to be processed by head-end nodes, tail-end nodes, or mid-point nodes. Also, the probe-specific fields may comprise an indication of an initiating/originating node of the probe (field 538), as described herein, as well as any other information (more or less, not shown) as configured by the sending device. Probe data field 540 may be used as described herein to carry information gathered by the probe, such as the requested metrics, error information, etc. Illustratively, such information 540 may be partially arranged/represented as a list/matrix 600.

Figure 6:
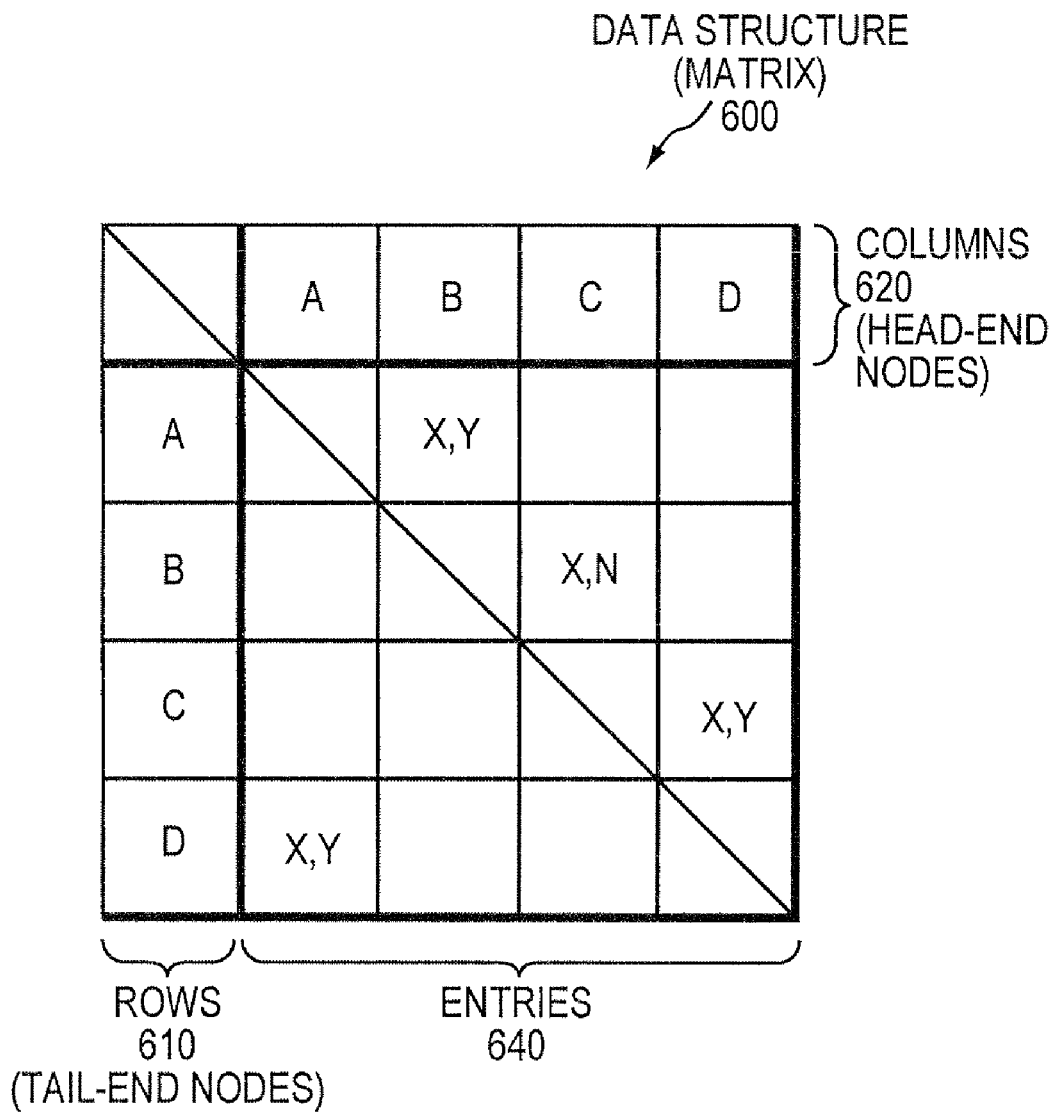
FIG. 6 illustrates an example data structure within a tunnel mesh probe message.

FIG. 6 illustrates an example data structure format (matrix) 600 that may be used in accordance with one or more embodiments described herein. For example, the tunnel mesh described herein (between nodes A-D) may be implicitly represented as a matrix of rows 610 and columns 620 corresponding to the head-end nodes and tail-end nodes of particular tunnels, where a row and column pair represent a particular tunnel. For instance, if columns represent head-end nodes, and rows represent tail-end nodes, then the "X,N" entry (described below) illustratively corresponds to a tunnel from head-end node C to tail-end node B (tunnel C-B). (Note that entries that correspond to the diagonal are irrelevant since there are no tunnels from a node to itself.) Each entry 640 of the matrix 600 may comprise one or more bits (or fields) that may each correspond to a particular metric of interest. For example, in addition to checking liveness of the tunnels, a metric of interest may be the proportion of tunnels that do not follow the shortest (nonconstrained) path (IGP path). In that case, each entry 640 of the matrix 600 may comprise two bits/fields: one bit for liveness (e.g., check marks) and the other bit to indicate whether the tunnel follows the shortest path (e.g., "Y" or "N"). Note that as described herein, if a tunnel is alive, indicating that tunnel's liveness inherently indicates that the particular tunnel has been probed for the tunnel mesh.

In accordance with embodiments described herein, assume in an illustrative example that the two following metrics are of interest: TE mesh control/data plane liveness and a number of tunnels that do not follow the shortest path where paths are made of strict hops only. The objective of the traveling probe (traveling labeled switched on the tunnels since only head/tail-end node processing is required due to strict hops) is thus to check that each tunnel of the mesh is alive, and whether it follows the shortest path. In this case, each entry 640 of matrix 600 comprises the two bits as described above. More complex metrics may be probed using the techniques described herein (e.g., jitter, delay, errors, error rates, etc.)

thus allowing the probes to collect/store any TE mesh metrics from any node/router in a TE/tunnel mesh.

Initially, a trigger occurs that essentially requests probing of the tunnel mesh, such as in response to a user/administrator command, or in response to a dynamic process configured to trigger probing, such as a periodic timer or in response to particular network events, etc. This trigger may specify a corresponding mesh ID and version (532), as well as the metrics of interest (534), such as for this example, checking the liveness of the tunnel mesh, and whether the shortest paths are taken. This trigger is received/detected at an initiating/originating node (e.g., node A), and in response, the initiating node may correspondingly retrieve a set of nodes in the mesh from its TED 245 (e.g., according to the AutoMesh technique described above), such as nodes A-D. These nodes may then be placed in a configured order, e.g., increasing order of node (IP) addresses, which may be used to build the matrix 600.

Notably, building the matrix 600 may be easily performed by each traversed node/router, thus alleviating the need to carry the number of nodes 'n'^2 (squared) address in the probe 500 data field 540. For instance, the matrix 600 need only carry entries 640 where each node of the mesh is configured to build/compute the matrix 600 in the same manner, e.g., based on arranging node addresses of the corresponding mesh into rows 610 and columns 620, accordingly, thus determining corresponding positions of entries 640 within the built matrix 600 for tunnels of the mesh. (Note that for small numbers of nodes within a mesh/network, an implementation may simply record the set of addresses in the probe 500/matrix 600.)

Moreover, this matrix representation (whether carried in probe 500 or computed at each node of the mesh) relies on the membership of the mesh of nodes not changing during the probing. To avoid incorrect signaling, a mesh version number may be associated with the mesh locally on each router and with the probe 500 (ID/version field 532). This version may be incremented whenever mesh membership changes, e.g., in accordance with AutoMesh techniques. Probes 500 with a non-matching version may be discarded and an error may be signaled back to the initiating node.

Illustratively, once the trigger has occurred, and the initiating node has prepared the probe 500, the initial probe may be sent from the initiating node to a selected tail-end node of a non-probed tunnel of the tunnel mesh (which, for the first probe sent, is any tunnel). As each node receives the probe 500, the probe is processed, that is, as a tail-end node for the probed tunnel and/or as a head-end node for a next tunnel to be probed. For instance, by merely receiving a probe 500 over a tunnel (label switched), the tail-end node may determine that the probed tunnel is alive, as both the control plane and data plane of the probed tunnel must be functional in order for the tail-end node to have received the probe.

As an alternative to checking liveness with the probe 500 itself, which may result in a lost probe if the tunnel being probed is not operational, an optional embodiment provides for sending a connectivity verification protocol message onto the tunnel to the next tail-end node (selected as described below), prior to sending the probe 500 to that next tail-end node. (Example connectivity verification protocols that may be understood by those skilled in the art for use on tunnels comprise bidirectional forwarding detection, or "BFD", or other known "Ping" techniques, such as specific to MPLS TE-LSPs, an "LSP Ping" for use on a tunnel.) For instance, by verifying connectivity (liveness) of the next tunnel to be probed, the node currently processing the probe may be able to detect an error (a non-responsive ping), and may send an error (to the initiating node, or, a different next tail-end node) with an indication of which tunnel is not alive (i.e., a "break in the chain"). If the ping is returned by the next tail-end node, then the currently handling node may mark the probe accordingly (liveness of the next tunnel to be probed), and may forward the probe, accordingly.

The node currently handling the probe may determine (e.g., randomly) a next node to which the probe may be forwarded (i.e., a tail-end node of a non-probed tunnel for which the current node is a head-end node). For instance, based on entries 640 of the matrix 600, the currently handling node may determine one or more tunnels (tail-end nodes) which have not yet been probed (e.g., an empty entry 640). From these one or more possibilities, a selection may be made, e.g., randomly or otherwise. The probe may then be forwarded to the selected (next) tail-end node of a non-probed tunnel, e.g., on the tunnel or not, as mentioned above.

If the node detects a problem with the probe, such as the tunnel of interest not being operational (no returned ping) or other problem (incorrect version, no non-probed tunnels, etc.), an error/report may be sent to the initiating node, such as by populating the data field 540 of probe 500 with the report of the problem, accordingly. If, on the other hand, the tunnel of interest is successfully checked (e.g., it is alive), then the corresponding bit of the matrix 600 is set (e.g., "X"), and the probe 500 is updated for forwarding to a next node. Note that as described above, whether the probed tunnel traverses the shortest path may also be stored within the probe 500 (matrix 600), either by the head-end node for strict-hop tunnels, or by a mid-point node for loose-hop tunnels, accordingly (this may also be performed retroactively by a tail-end node for strict-hop tunnels).

Figure 7A:
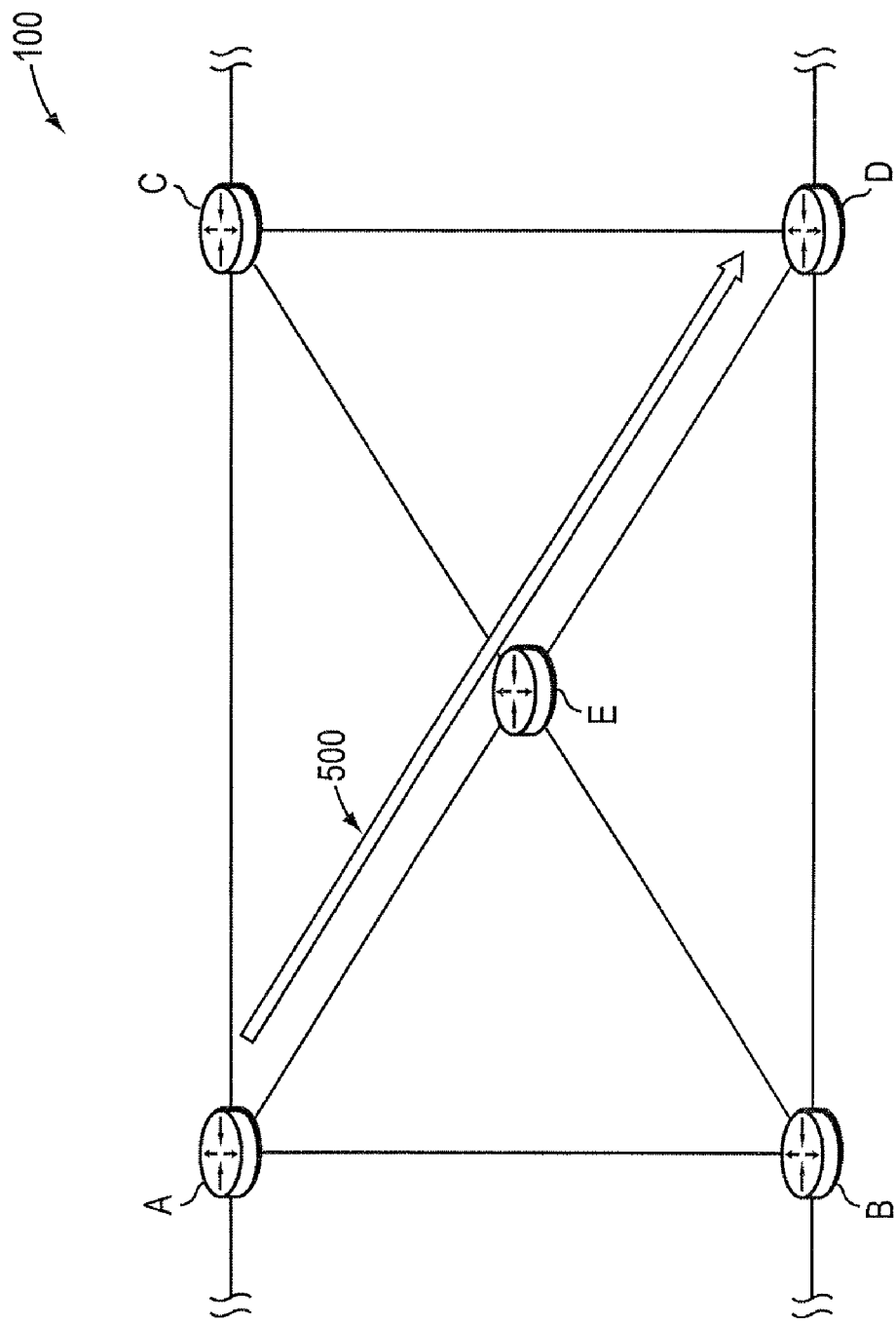
FIGS. 7A-D illustrate example computer networks and transmitted tunnel mesh probe messages.
Figure 7B:
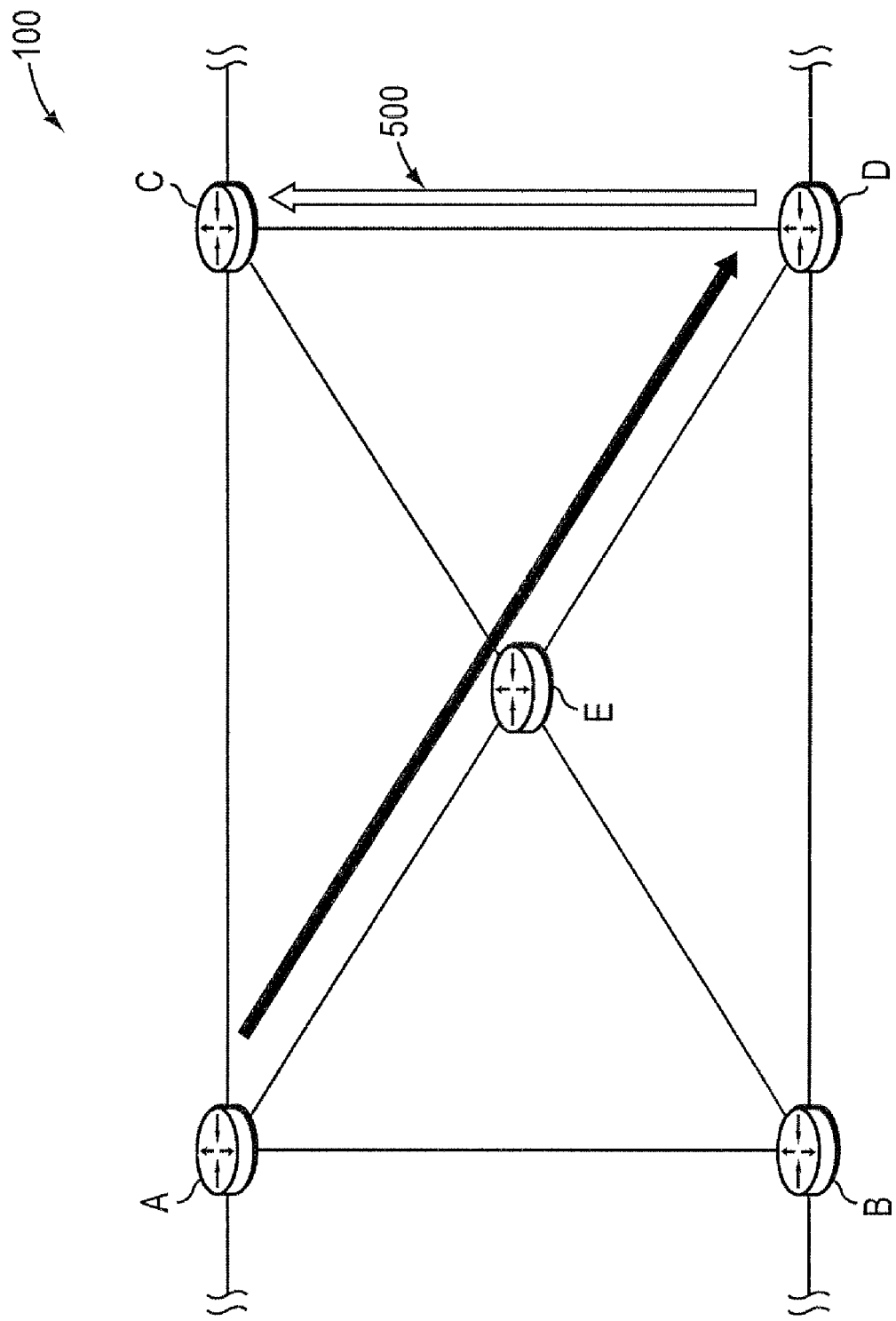
Figure 7C:
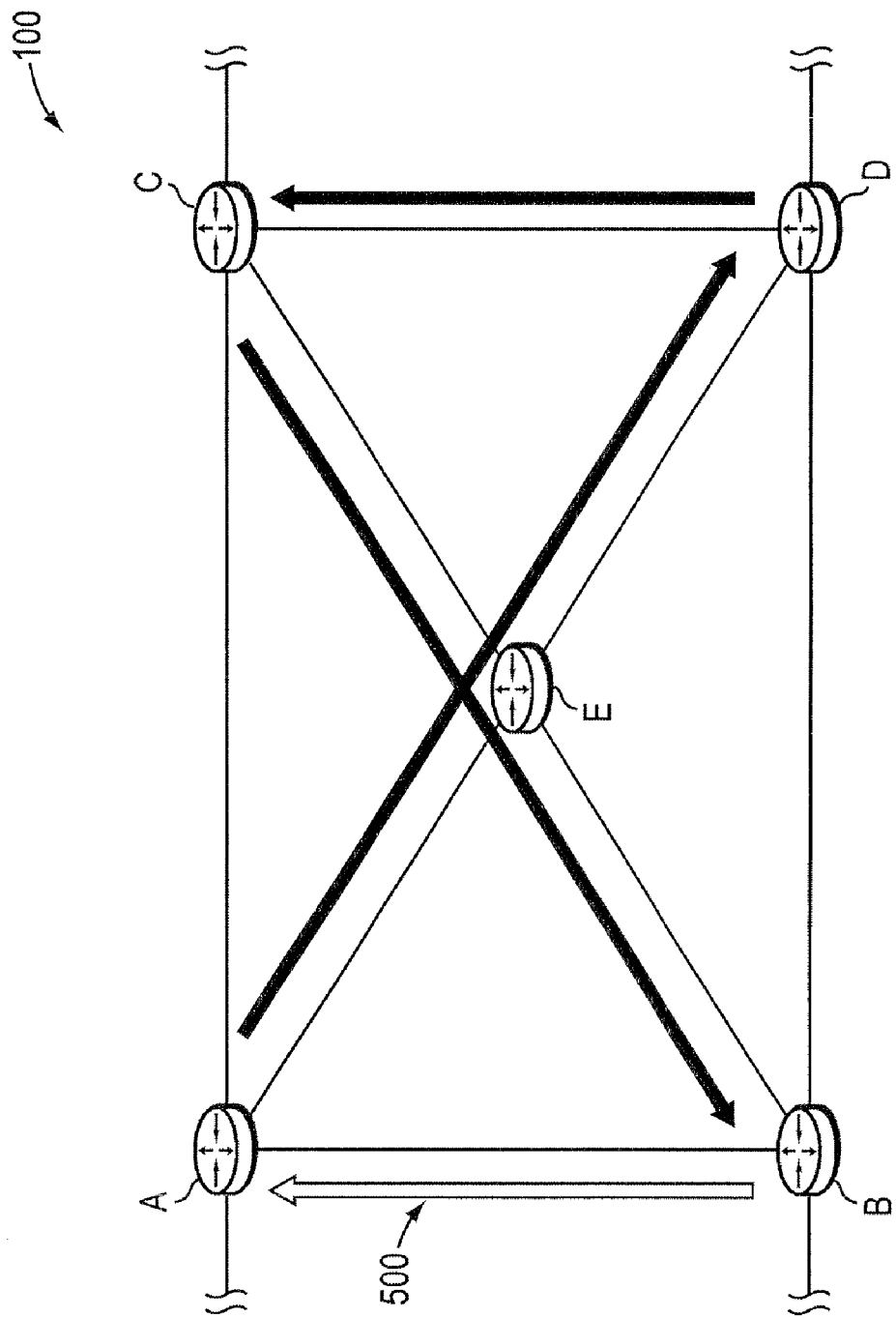

The probe thus travels from node to node within the mesh, "bouncing" between edges (head/tail-end nodes) in this manner until each tunnel of the mesh has been probed, and the matrix 600 is filled. For example, FIGS. 7A-7D illustrate an example (abbreviated) sequence of probe exchanges in network 100 in accordance with one or more embodiments described above. For instance, FIG. 7A illustrates an initial tunnel checked by probe 500, from head-end (initiating) node A to tail-end node D (tunnel A-D). As described above, node D may process the probe, and based on matrix 600, may determine that the probe may be forwarded to node C (FIG. 7B). This process may continue through to FIG. 7C, illustrating tunnels A-D, D-C, C-B, and B-A having been checked, notably corresponding to illustrated matrix 600 of FIG. 6. Note that the entry 640 corresponding to tunnel C-B indicates that the tunnel is alive ("X"), but does not traverse the shortest path ("N"). This may have been determined by node C based on strict hops, such as if the tunnel C-B actually traversed path C-D-B, rather than shorter path C-E-B, such as where the latter path did not meet a particular constraint of tunnel C-B.

Figure 7D:
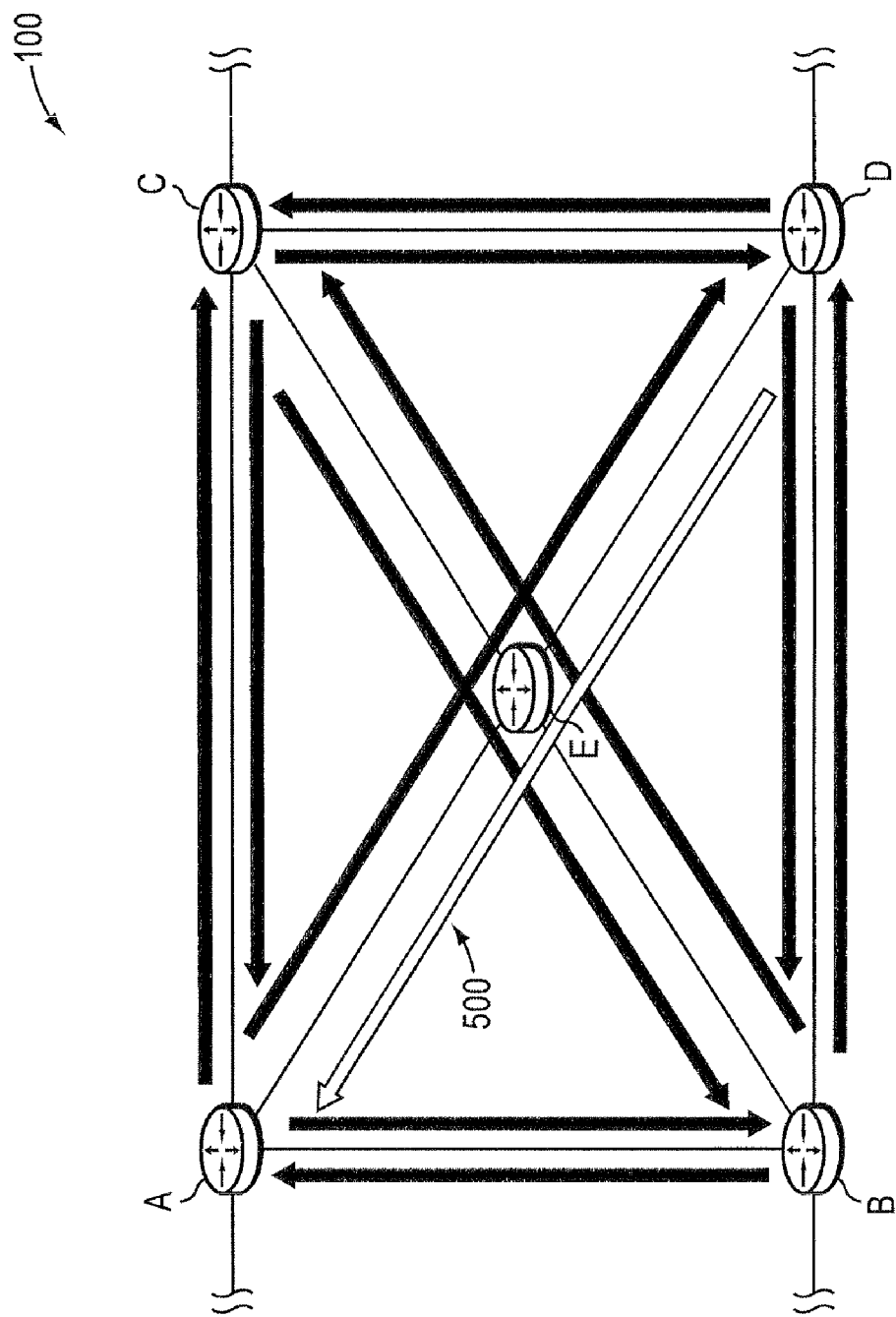

As the probe travels from node to node, at each node of the mesh, there will either be a previously unchecked (non-probed) tunnel, or all checking (probing) has finished, i.e., the probe has been returned to the initiating node, and all tunnels for which the initiating node is a head-end node have been probed previously (e.g., FIG. 7D). In particular, as may be appreciated, the matrix 600 is a square matrix (equal numbers of rows and columns for a full mesh between nodes), and thus each node is visited N−1 times from other nodes, and visits N−1 nodes in turn, hence, the number of tunnels in the mesh is N*(N−1), as mentioned above. Thus, when a node selects the last tunnel (to the initiating node), all other nodes will have already visited the initiating node (e.g., tunnels X-A), and the initiating node will have visited all other tunnels (e.g., tunnels A-X). (Notably, those skilled in the art will appreciate that a negligible number of possible randomly selected outcomes may result in an incomplete probe, such as where each node returns the probe 500 to the originating node only, e.g., A-B, B-A, A-C, C-A, A-D, and D-A, or other rarely occurring sequences. If such an event occurs, a new probe may be initiated, whose odds of repeating the incomplete probe's path are substantially minimal.

Accordingly, an alternative that may be used to avoid this situation is for nodes to send the probe to the initiation node when it is the only choice left. In this manner, the probe is guaranteed to visit all tunnels. Specifically, since the identification of the initiating node is carried within the probe 500 (in field 538), nodes may avoid returning the probe to the initiating node by sending the probe to nodes in the order used for the matrix 600 (e.g., increasing address), and sending the probe to the originator last.

Another way to implement this is to have the initiating node place all nodes of the mesh in matrix order, and send a probe to the first node. Then, whenever the initiating node receives a probe, it sends the probe to the next node in that order, until all nodes are exhausted. A node receiving a probe from the initiating node enters a "hub state" and places all nodes greater than itself (e.g., higher addresses) in order, except the initiating node, into the matrix 600 and sends the probe 500 to the first node of the matrix order. Whenever a node in hub state receives a probe, it sends the probe to the next node in order, unless there are no more non-originator nodes to send to. In that case, the node takes itself out of hub mode and sends the probe to the initiating node. When a node that is not in hub state (and is not the initiating node) receives a probe, it send the next probe to the sender of the probe it received, thus acting as a "spoke" returning the probe back to the hub (the node in hub state). In this manner, only two nodes, the initiating node and the current hub state node, are maintaining state about the probe. Being completely predictable, this also allows for an optimization where instead of carrying the full matrix of results, the probe need only contains that portion which is relevant. That is, each time the probe returns to the initiating node, the probe results are stored, and changes are made to the probe to contain a new relevant part of the matrix. Similarly, when a hub sends a probe, it need not include the matrix 600 (but need only maintain the matrix locally, gathering results), and a spoke returning a probe need only return the result for the probe from hub to spoke. (Notably, this "hub-and-spoke" technique may be used to introduce parallelism, such as where N parallel probes are operating in the network without overlapping the same tunnel. For instance, the initiating node may send N probes to the first N nodes in its list, and the algorithm continues as described above.)

Once the entire matrix 600 has been checked, or a report/error has been received, the probe is completed by the initiating node, such as by processing the completed probe and reporting the results (e.g., to an administrator, interested process, etc.). The probe 600 may then be discarded. Note that various "back-off" timers, as will be understood by those skilled in the art, may be used by the initiating node should it not receive the probe without an explicit error message) within a certain period of time.

Figure 8:
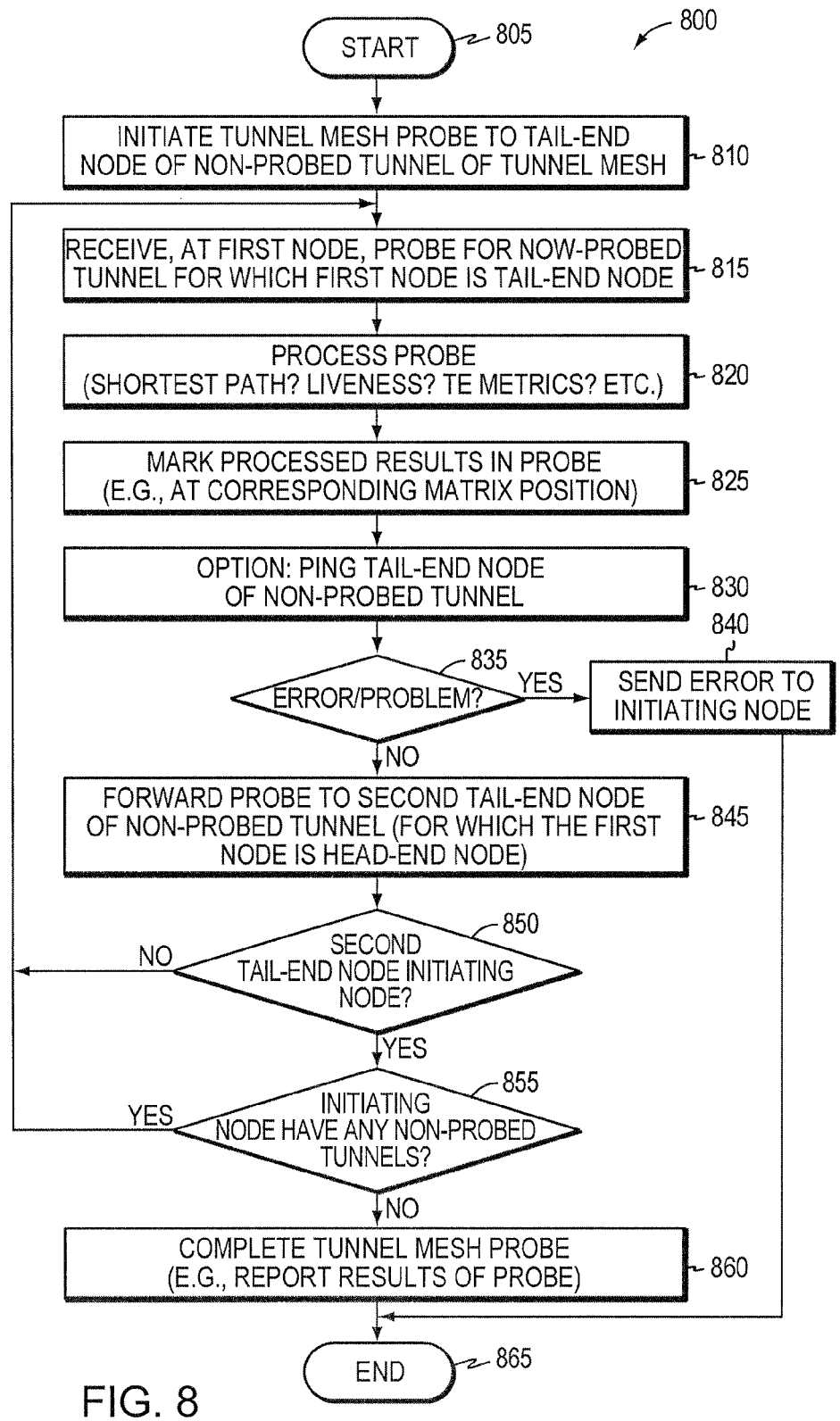
FIG. 8 illustrates an example procedure for efficiently probing a tunnel mesh.

FIG. 8 illustrates an example procedure for efficiently probing a tunnel mesh in accordance with one or more embodiments described herein. The procedure 800 starts at step 805, and continues to step 810, where a tunnel mesh probe 500 (or as part of message 300) is initiated by an initiating node (e.g., node A) to a tail-end node (e.g., D) of non-probed tunnel (A-D) of a tunnel mesh. For instance, as described above, the initiating node may be responding to a trigger (e.g., administrator command), and may select the non-probed tunnel (and corresponding tail-end node) based on a random algorithm and the list of currently non-probed tunnels (e.g., list 600, which at the time of initiation, indicates that all tunnels are non-probed tunnels). Also, the probe may be encapsulated within the tunnel A-D, or may be sent (routed) to the tail-end node D in a Path message 300. (Note that if the probe is routed and not switched, a mid-point node, e.g., node E, may process the probe, accordingly.)

Tail-end node D of tunnel A-D may then receive the probe in step 815 (such that tunnel A-D is a now-probed tunnel), and processes the probe in step 820 as described above. For instance, the tail-end node may confirm liveness, measure various TE metrics, etc., including processing the probe in accordance with a next tunnel, such as whether the next tunnel traverses the shortest path, etc. Also, the receiving node (tail-end node) D may further process the probe in step 820 by determining a next tunnel for which the probe should be transmitted. For example, by examining the matrix 600, node D may determine that none of the tunnels for which node D is the head-end node have been probed, and as such, may randomly (or otherwise) select a tunnel, e.g., tunnel D-C.

Now that the tunnel A-D (and/or the next tunnel) has been checked, the processed results may be marked within the probe in step 825, e.g., at the corresponding matrix position of structure 600. Optionally, as mentioned above, the tail-end node of the next non-probed tunnel may first be pinged in step 830 to check for liveness. Notably, if there is an error or problem in step 835, such as an unreturned optional ping or any other problems, then in step 840, the receiving/tail-end node (or any other node) may send an error message to the initiating node (node A), and the procedure ends in step 865.

Assuming there are no errors, however, in step 845 the receiving/tail-end node (e.g., D) may forward the probe (as a sending/head-end node) to a second tail-end node of the selected non-probed tunnel, e.g., node C of tunnel D-C. If the second tail-end node is not the initiating node in step 850, then the procedure returns to step 815, where the second tail-end node C (now the "first" tail-end node) receives the probe. If, on the other hand, the second tail-end node is the initiating node A in step 850, then in step 855 the initiating node determines whether there are any remaining non-probed tunnels. If there are remaining non-probed tunnels, then the initiating node is a "first" tail-end node in step 815, but if not, then the tunnel mesh probe is completed (e.g., and reported) in step 860. In particular, as mentioned above, once the probe reaches the initiating node, and the initiating node has probed all of its tunnels for which it is the head-end node, then the probe has traversed each tunnel of the mesh, and the procedure ends in step 865, having efficiently probed/checked all tunnels of the mesh.

Advantageously, the novel techniques described herein efficiently probe a tunnel mesh in a computer network. In particular, the techniques described above define a set of network-based mechanisms that may be used to check an entire tunnel mesh from any node (initiating node) of the mesh using a traveling probe that visits each head/tail-end node of each tunnel (e.g., via the tunnel or not) to collect one or more metrics of interest. In other words, through the OAM tools for tunnel meshes (rather than monitoring an individual tunnel) that use traveling probes between edges (head/tail-end nodes), the techniques described above allow for an administrator or process (e.g., of a service provider) to check various TE mesh metrics from any node/router of the mesh.

While there have been shown and described illustrative embodiments that efficiently probe a tunnel mesh in a computer network, it is to be understood that various other adaptations and modifications may be made within the spirit and scope of the pre-sent invention. For example, the embodiments have been shown and described herein with various features and functionalities that are given with specific illustrations (e.g., types of metrics, techniques for carrying information, etc.). However, the embodiments of the invention in their broader sense are not so limited, and may, in fact, be used with other suitable features and functionalities.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   receiving, at a first node in a computer network having a tunnel mesh, a tunnel mesh probe for a probed tunnel for which the first node functions as is a tail-end node, the tunnel of the tunnel mesh for which the first node functions as head-end node mesh probe carrying within the probe an indication of whether a particular tunnel has already been probed;
   processing the probe;
   determining a non-probed tunnel from a plurality of tunnels of the tunnel mesh for which the first node functions as is a head-end node; and
   forwarding the probe to a second node that functions as tail-end node of the non-probed tunnel of the tunnel mesh for which the first node is the functions as head-end node.

2. The method as in claim 1, further comprising:
   indicating a particular version of the tunnel mesh within the probe.

3. A method, comprising:
   receiving, at a first node in a computer network having a tunnel mesh, a tunnel mesh probe for a probed tunnel for which the first node functions as tail-end node, the tunnel mesh probe carrying within the probe a listing of tunnels of the tunnel mesh, the listing arranged as a matrix of node addresses of nodes that function as head-end nodes and nodes that function as tail-end nodes of the tunnels within the tunnel mesh;
   processing the probe;
   determining a non-probed tunnel from a plurality of tunnels of the tunnel mesh for which the first node functions as head-end node; and
   forwarding the probe to a second node that functions as tail-end node of the non-probed tunnel of the tunnel mesh for which the first node functions as head-end node.

4. The method as in claim 3, wherein the matrix does not carry node addresses, the method further comprising:
   computing, at the first node, a corresponding position of the probed tunnel within the matrix based on node addresses of nodes that function as head-end nodes and nodes that function as tail-end nodes of the tunnels within the tunnel mesh.

5. The method as in claim 1, the method comprising:
   sending an initial tunnel mesh probe from an initiating node to the first node.

6. The method as in claim 5, further comprising:
   sending the initial probe in response to a trigger to probe the tunnel mesh.

7. The method as in claim 5, further comprising:
   determining, by the initiating node, that the initiating node functions as head-end node for only probed tunnels; and
   in response
   completing the tunnel mesh probe.

8. The method as in claim 7, further comprising:
   reporting results of the probe.

9. The method as in claim 1, wherein the probe travels on a path that is not on a tunnel.

10. The method as in claim 1, further comprising:
    detecting a problem with the probe; and in response
    sending an error to an initiating node of the probe.

11. The method as in claim 1, further comprising:
    checking for tunnel liveness of the tunnel mesh with the probe.

12. The method as in claim 1, further comprising:
    storing within the probe whether a probed tunnel traverses a shortest path.

13. The method as in claim 12, wherein the storing is performed by a node that functions as head-end node of the probed tunnel in response to a strict-hop tunnel.

14. The method as in claim 12, wherein the storing is performed by a node that functions as mid-point node of the probed tunnel in response to a loose-hop tunnel.

15. The method as in claim 1, further comprising:
    storing one or more traffic engineering metrics of a tunnel within the probe.

16. The method as in claim 1, further comprising:
    pinging the second node that functions as tail-end node of the non-probed tunnel;
    if a ping response is received, forwarding the probe to the second node that functions as tail-end node of the non-probed tunnel; and
    if a ping response is not received, sending an error to an initiating node of the probe.

17. The method as in claim 1, further comprising:
    entering a hub state at the first node.

18. An apparatus, comprising:
    one or more network interfaces configured to communicate over one or more tunnels of a tunnel mesh in a computer network;
    a processor coupled to the network interfaces and configured to execute one or more processes; and
    a memory configured to store a tunnel mesh probe process executable by the processor, the tunnel mesh probe process when executed operable to: i) receive a tunnel mesh probe for a probed tunnel for which the apparatus functions as tail-end node, the tunnel mesh probe carrying in the probe an indication of whether a particular tunnel of the tunnel mesh for which the apparatus functions as head-end node has already been probed; ii) process the probe; iii) determine a non-probed tunnel from a plurality of tunnels of the tunnel mesh for which the apparatus functions as head-end node; and iv) forward the probe to a second node that functions as tail-end node of the non-probed tunnel of the tunnel mesh for which the apparatus functions as head-end node.

19. The apparatus as in claim 18, wherein the tunnel mesh probe process is further operable to:
- determine that the apparatus functions as head-end node for only probed tunnels; and in response
- complete the tunnel mesh probe.

20. A method, comprising:
- initiating, from an initiating node in a computer network having a tunnel mesh, a tunnel mesh probe for the tunnel mesh;
- receiving the probe for a probed tunnel at a first tail-end node of the probed tunnel, the tunnel mesh probe carrying in the probe an indication of whether a particular tunnel of the tunnel mesh for which the tail-end functions as head-end node has already been probed;
- in response, i) processing the probe; and ii) forwarding the probe to another tail-end node of a non-probed tunnel of the tunnel mesh for which the first tail-end node functions as head-end node;
- receiving the probe at the initiating node; and
- in response to determining that the initiating node functions as head-end node for only probed tunnels, completing the tunnel mesh probe.

21. An apparatus, comprising:
- means for receiving, at a first node in a computer network having a tunnel mesh, a tunnel mesh probe for a probed tunnel for which the first node functions as tail-end node, the tunnel mesh probe carrying in the probe an indication of whether a particular tunnel of the tunnel mesh for which the first node functions as head-end node has already been probed;
- means for processing the probe;
- means for determining a non-probed tunnel from a plurality of tunnels of the tunnel mesh for which the first node functions as head-end node; and
- means for forwarding the probe to a second node that functions as tail-end node of the non-probed tunnel of the tunnel mesh for which the first node functions as head-end node.

\* \* \* \* \*

UNITED STATES PATENT AND TRADEMARK OFFICE
CERTIFICATE OF CORRECTION

PATENT NO. : 8,199,658 B2  Page 1 of 1
APPLICATION NO. : 12/048390
DATED : June 12, 2012
INVENTOR(S) : Jean-Philippe Vasseur et al.

It is certified that error appears in the above-identified patent and that said Letters Patent is hereby corrected as shown below:

Col. 13, line 42-43 should read: "mesh for which the first node ~~is the~~ functions as head-end node"

Signed and Sealed this
Thirty-first Day of July, 2012

David J. Kappos
*Director of the United States Patent and Trademark Office*